United States Patent [19]
Zilber

[11] Patent Number: 5,365,289
[45] Date of Patent: Nov. 15, 1994

[54] MANUAL CASSETTE SYSTEM FOR OVERHEAD PROJECTION TRANSPARENCIES

[76] Inventor: Steven A. Zilber, Reserve Sq., #16T-W, 1701 E. 12th St., Cleveland, Ohio 44114-3237

[21] Appl. No.: 37,930

[22] Filed: Mar. 26, 1993

Related U.S. Application Data

[63] Continuation-in-part of Ser. No. 903,242, Jun. 23, 1992, Pat. No. 5,198,846.

[51] Int. Cl.$^5$ .............................................. G03B 21/00
[52] U.S. Cl. ............................ 353/120; 353/DIG. 5; 353/DIG. 1; 206/556
[58] Field of Search ................ 353/120, 122, DIG. 1, 353/DIG. 3, DIG. 5, 114, 116, 113, 103, 104; 206/449, 555, 455, 456, 556

[56] References Cited

U.S. PATENT DOCUMENTS

| | | | |
|---|---|---|---|
| 2,152,174 | 3/1939 | Brunetti | 206/40 |
| 3,953,090 | 4/1976 | Fuchs | 206/74 |
| 4,295,565 | 10/1981 | Takeuchi | 206/455 |
| 4,415,079 | 11/1983 | Ackeret | 206/455 |
| 4,756,616 | 7/1988 | Min et al. | 353/DIG. 5 |
| 5,059,020 | 10/1991 | Génièis | 353/DIG. 5 |
| 5,172,145 | 12/1992 | Stephenson | 353/DIG. 5 |
| 5,198,846 | 3/1993 | Zilber | 353/120 |

*Primary Examiner*—William A. Cuchlinski, Jr.
*Assistant Examiner*—William C. Dowling
*Attorney, Agent, or Firm*—Fay, Sharpe, Beall, Fagan, Minnich & McKee

[57] ABSTRACT

A system for facilitating the handling of overhead projector transparencies on an overhead projector of the type including an upwardly facing projector platen. The system includes a frame assembly to provide a support surface adjacent the projector platen. A transparency storage cassette is supported on the support surface in alignment with the projector platen and generally includes a housing defining a closed chamber. An upwardly biased follower plate is mounted within the chamber to support a stack of transparencies. An access door allows loading of the transparencies into the chamber. Between the door and the follower plate is a cam arrangement to move the follower plate downwardly against the bias when the door is moved to an open position to thereby facilitate the loading of the transparencies into the chamber. A transparency discharge slot is provided in the housing along the side adjacent the projector platen, and an opening in the top wall of the housing permits manual access to the top transparency in the stack to thus allow the top transparency to be slid from the stack out of the housing through the discharge slot to a projecting position on the projector platen. The transparencies then are slid into a receptacle. One embodiment of the receptacle includes a curved reversing surface and a storage surface to maintain the order of the transparencies as they are serially passed over the projector platen.

19 Claims, 4 Drawing Sheets

MANUAL CASSETTE SYSTEM FOR OVERHEAD PROJECTION TRANSPARENCIES

RELATED APPLICATION

This application is a continuation-in-part of U.S. patent application No. 07/903,242, filed Jun. 23, 1992 now U.S. Pat. No. 5,198,846.

BACKGROUND OF THE INVENTION

The subject invention is directed generally to the art of visual projection systems and, more particularly, to a manually-operated cassette system for storing, transporting, feeding, and receiving overhead projection transparencies.

Overhead projectors frequently are used to provide visual aids during oral presentations made to small and medium size groups. Previously, there was no simple, convenient system available to store, transport, and assist in feeding the transparencies or slides to the projector itself. Although some prior art power-operated devices of significant complexity have been available, these generally are not suitable for the typical overhead projection user. Accordingly, there exists a distinct and ongoing need to provide a simple, manually-operable system.

BRIEF STATEMENT OF THE INVENTION

In general, the subject invention is arranged to provide a neat and reliable system for storing and feeding slides or transparencies one-by-one to an overhead projector during a presentation. Use of the system minimizes chances of operator error by preventing misfeeds and multi-feeds. More importantly, the apparatus and system provides a means to keep the slides in order both prior to using them and after they have been dispensed. The system reduces clutter and places the slides in a readily accessible position in the event a given slide must be re-displayed for review. As will become apparent, the subject system is adaptable for use with any of a variety of overhead projectors and provides a sturdy, secure, and durable means for transport and storage of slides in cassettes that can be easily stacked, shelved, and labeled.

The invention generally contemplates a storage cassette for holding and dispensing overhead projector transparencies and includes a housing having top, bottom, and side walls defining a generally rectangular chamber sized for closely enclosing a stack of the overhead transparencies. The housing has an open end sized to permit insertion of a stack of transparencies. Positioned in the chamber and extending transversely thereof generally parallel to the top and bottom walls is a follower plate element having a transverse extent sufficient to support the stack of transparencies. The follower plate is continually maintained under a bias toward the top wall by biasing means positioned between the follower plate and the bottom wall. The cassette also includes at the open end of the housing an access door that can move from a closed position to an open position for permitting ready loading of transparencies into the chamber to the location between the follower plate and the top wall. Interconnecting means are provided between the access door and the follower plate to move the follower plate away from the top wall against the biasing means when the movable wall portion is moved to an open position. Transparencies can be moved from the stored position within the chamber outwardly through a discharge slot by manual engagement of the top transparency in the storage stack through an access opening provided in the top wall.

Preferably, the discharge slot includes a resilient flap which defines the lower edge of the discharge slot and acts to prevent those slides beneath the topmost slide from being ejected through the slot when the topmost slide is removed In an alternative embodiment, the transparency storage cassette of this invention is provided with anti-pushdown means for preventing depression of the follower plate during manual sliding of the top transparency through the discharge slot. The anti-pushdown means includes an engaging member mounted on the edge of the follower plate adjacent the open end of the housing where the access door is provided, with the engaging member extending toward the access door. The anti-pushdown means further includes engaging means for resisting downward movement of the engaging member during manual sliding of the top transparency through the discharge slot, the engaging means being disposed on the inside face of the access door. Preferably, the engaging means includes a plurality of ratchet teeth disposed one above another on the inside face of the access door.

Broadly, and in accordance with another aspect, the subject invention contemplates a system for facilitating the handling of overhead projector transparencies on an overhead projector of the type including an upwardly facing projector platen. The system of the invention generally includes a frame assembly associated with the projector to provide a first support surface adjacent a side of the projector platen. A transparency storage cassette is supported on the first support surface in alignment with the projector platen. The storage cassette generally includes a housing having an open end through which transparencies can be discharged serially in a discharge direction from the storage cassette to the projector platen.

Preferably, and in accordance with a more limited aspect of the invention, the frame assembly includes a second support surface adapted to be mounted adjacent the projector platen on a side opposite the first support surface. The second support surface is provided with a receptacle into which the transparencies are adapted to be received after they have been dispensed from the cassette and moved across the overhead projector platen. Preferably, the receptacle is provided with means to maintain the overhead slides in a slightly misaligned stack for easy access in case of need for review.

In accordance with a further aspect of the invention, the frame assembly is preferably collapsible and adjustable and includes adjustable support straps, which extend over the projector platen between the first and second support surfaces, together with adjustable support legs, which extend downwardly from the first and second support surfaces.

A second embodiment of the receptacle of this invention receives and maintains the order of transparencies that have been passed serially in a discharge direction to a discharge side of an overhead projector platen. The receptacle comprises a reversing surface adapted to be mounted on the discharge side of an overhead projector and a storage surface. The reversing surface includes an upper edge, a lower terminal edge, an upper curved portion depending from the upper edge, and a lower curved portion depending from the upper curved portion and terminating at the lower terminal edge. The upper curved portion is convex in the discharge direction and the lower curved portion is concave in the discharge direction. The storage surface has a proximal edge connected to the lower terminal edge of the reversing surface and a distal edge extending upwardly and in the discharge direction from the lower terminal edge.

As can be seen from the foregoing, a primary object of the invention is the provision of a sturdy, secure, and durable apparatus and system for efficiently transporting and storing overhead projector slides.

A further object is the provision of apparatus including a slide storage and transportation cassette than can be used to dispense the slides in proper sequence.

A still further object is the provision of a system of the type described that is inexpensive and easily manufactured and used.

A still further object is the provision of an apparatus and system of the type described that is adaptable for use with nearly any type of overhead projector apparatus.

Yet a further object is the provision of a storage cassette for overhead projector slides that is easy to load and unload and that maintains the slides properly oriented and related for correct sequential discharge.

Another object is the provision of a storage cassette that will not bind during manual sliding of the transparencies.

Still another object is the provision of a receptacle that will receive and maintain the order of transparencies or the like that have been passed serially over a overhead projector platen.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENTS

Figure 1:
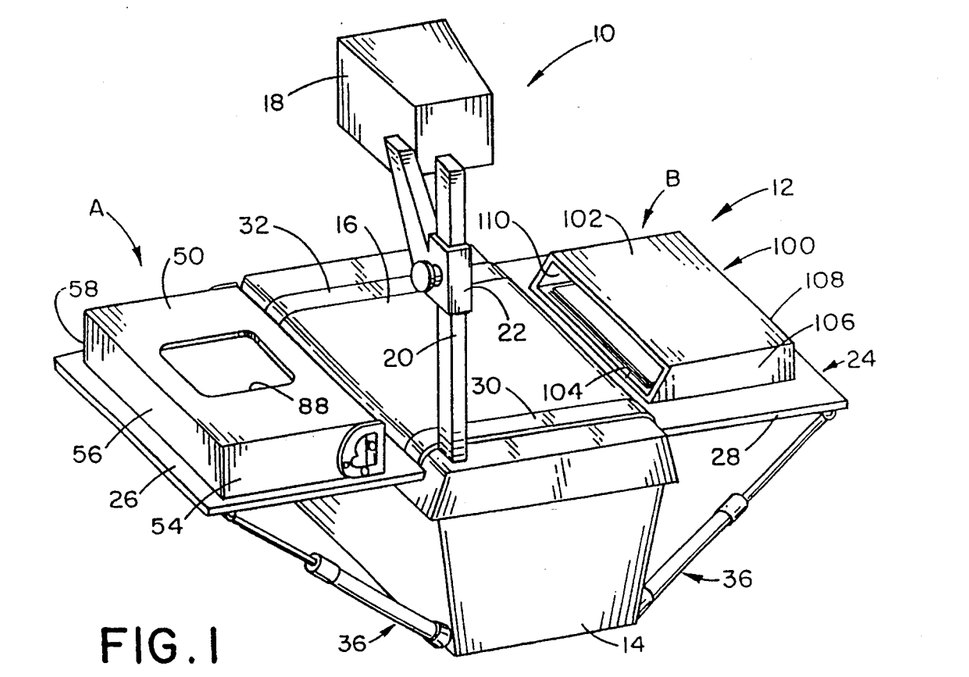
FIG. 1 is an isometric view showing an overhead projector associated with a manually-operated cassette system for facilitating the handling of the necessary projection transparencies.
Figure 2:
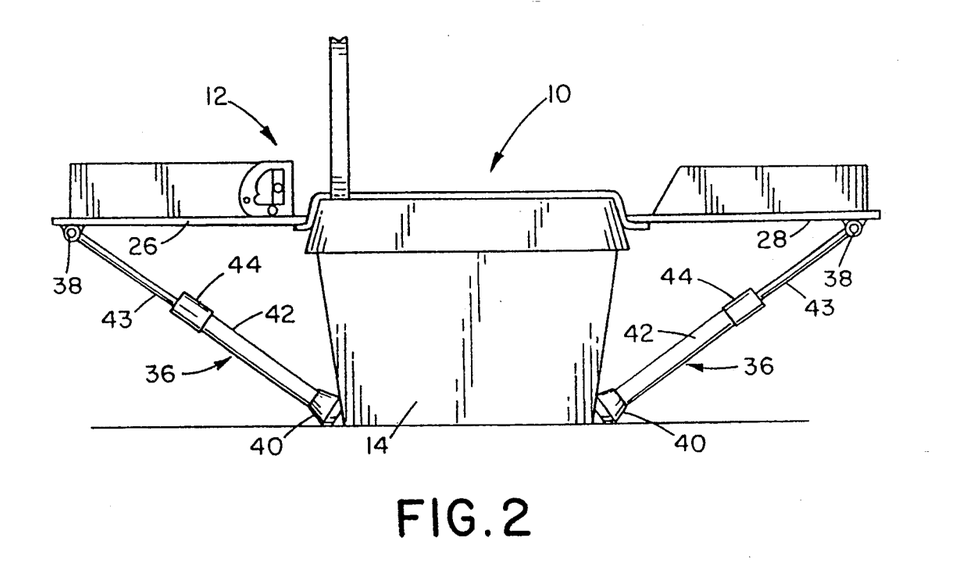
FIG. 2 is a front elevational view of the apparatus shown in FIG. 1.

Referring more particularly to the drawings wherein the showings are for the purpose of illustrating preferred embodiments of the invention only, and not for the purpose of limiting same, FIGS. 1 and 2 best illustrate the overall arrangement of a conventional overhead projector 10 having the improved manually operated cassette system 12 of the subject invention arranged to facilitate the storage, transport, and feeding of the overhead projection transparencies to a projection position. The overhead projector 10 generally is illustrated as comprising a base housing 14, which includes the usual projection lamps and supports a horizontally extending, upwardly facing projector platen 16. Platen 16 is mounted to extend generally horizontally beneath the usual mirror system 18. The mirror system or assembly 18 is suitably mounted from a corner post 20 and is provided with adjusting or focusing means 22 in a conventional manner.

It should be understood that the overhead projector 10 is merely illustrated as one possible type of overhead projector system that can be used with the subject device. Other such projectors of differing construction can be used equally well.

Of particular importance to the invention is the overall arrangement of the system 12 that facilitates the handling of the transparency slides as they are moved from a stored position in a cassette A to a position on the projector platen 16 and then to a receiving position defined by a receptacle B. As previously discussed, the system of the invention is arranged to provide for the optimal flow of the overhead projection slides from the storage position to the platen to a receiving receptacle.

In the subject arrangement, this system includes a frame assembly comprising first and second support surfaces 26 and 28, which are designed to be mounted on opposite sides of the projector platen 16 to support the associated structure in a most convenient position and location. The support surfaces or members 26 and 28 generally comprise relatively rigid shelf-like members formed of suitable material, such as metal, plastic, or wood. The individual members 26 and 28 are connected by adjustable flexible belts or straps 30 and 32, which extend between the side edges in the manner shown in FIG. 1 and can be suitably adjusted in length to fie the projector, such as through the use of buckles or snaps (not illustrated). The straps, as can be quickly understood, are adjusted so that the composed edges of the support surfaces 26 and 28 closely engage along the lateral sides of the projection platen 16 as illustrated. Preferably, the lengths of the straps are adjusted such that the edges of the supports 26 and 28 are only slightly below the top surface of the platen 16 and thus are prevented from shifting laterally across the top surface. The stability of supports 26 and 28 can be further enhanced through the use of anti-friction rubber stops or similar surfaces carried on the edges of the support surfaces 26 and 28 to engage the sides of the overhead projector housing.

The outer, free edges of the support surfaces 26 and 28 are suitably carried by adjustable supports or leg members 36, each of which preferably has a first end pivoted to the respective support surface at a location 38 as best seen in FIG. 2. A second end of each member 36 preferably is provided with a rubber friction or cushion tip 40. Each of the legs 36 is adjustable in length to allow it to be suitably adjusted to allow the assembly to be used with different sizes and types of overhead projectors. For this reason, each of the adjustable legs 36 preferably comprises a pair of tubular members 42 and 43, which are telescopically interconnected and provided with a locking collet 44 to permit each leg to be clamped in its desired position of adjustment.

The arrangement thus far described permits a suitable support surface to be provided on each of the two lateral sides of the overhead projector platen 16 to facilitate the flow of the transparencies from the storage cassette to the receiving cassette during the presentation.

Figure 3:
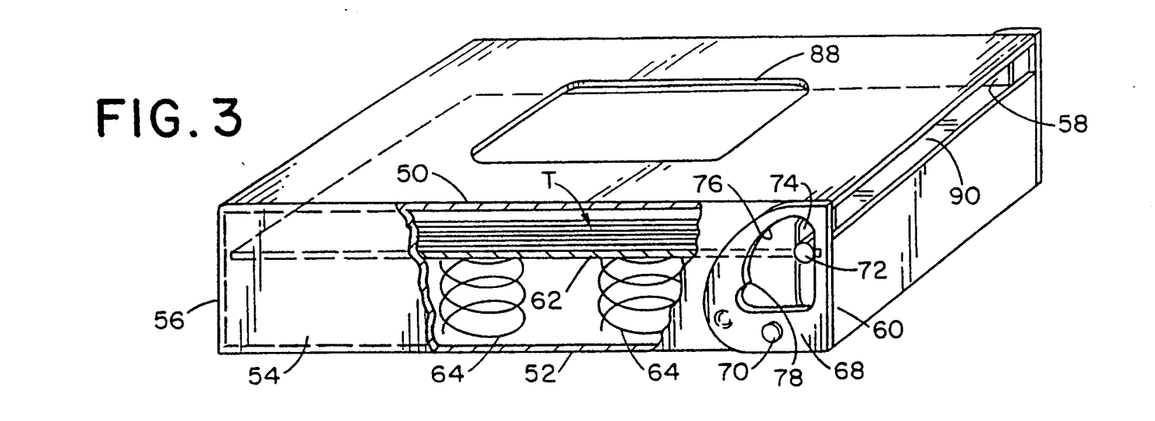
FIG. 3 is an isometric view of the storage and dispensing cassette shown in the FIG. 1 system (portions have been broken away to more clearly show features of construction)
Figure 4:
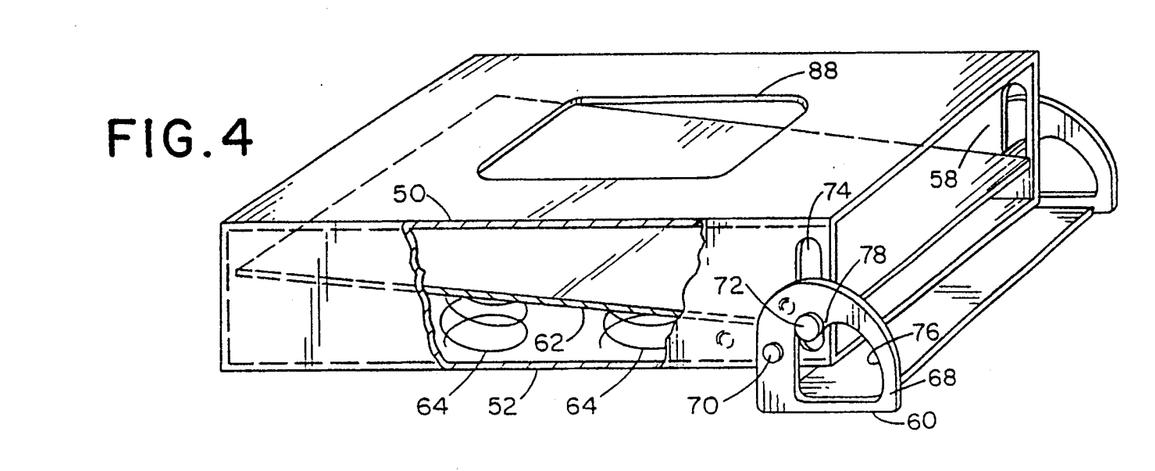
FIG. 4 is a view similar to FIG. 3 but showing the cassette in an open position preparatory to loading transparencies therein.

The storage and dispensing cassette assembly A can best be understood by reference to FIGS. 1, 3, and 4. Broadly, the storage and dispensing cassette is arranged to store the projection transparencies in an aligned stack so that the individual transparencies can be in proper serial order. Broadly, the cassette includes a housing having opposed, spaced, parallel top and bottom walls 50, 52, respectively. The top and bottom walls are interconnected by suitable side walls 54, 56, and 58 to form a generally rectangular box with an open end opposite side wall 56.

The interior of the cassette housing carries a follower plate element 62, which extends generally horizontally between the top and bottom walls 50, 52. The size of the interior of the cassette and the follower plate 62 is such as to allow the follower plate to support a suitable stack of transparencies T in position between it and the interior of the top wall 50 as illustrated in FIG. 3.

Preferably, the follower plate 62 is maintained under a continual upward bias by suitable biasing means. Many types of biasing means could be used but, in the disclosed embodiment, the biasing means comprises a plurality of compression springs 64 positioned between the follower plate and the bottom wall 52.

The storage cassette A further includes an access door to allow ready access to the interior of the chamber for loading the transparencies thereinto. The right side wall, as viewed in FIG. 3, is pivotally mounted so as to function as an access door 60. As illustrated, access door 60 is carried by identical cam plates 68 connected at opposite ends of the door 60. The cam plates 68 are each shaped as shown in FIGS. 3 and 4 and are mounted for pivotal movement about a horizontal axis extending transversely between the side walls 54 and 58 and parallel to the top and bottom walls 50, 52. In the disclosed embodiment, the hinge means for the access door 60 comprises suitable pins 70 extending outwardly from the side walls 54, 58 at the locations illustrated. This hinge mounting arrangement allows the movable wall or access door 60 to be pivoted from the closed position shown in FIG. 3 to the fully open position shown in FIG. 4.

According to one aspect of the subject invention, the access door 60 and the cam plates 68 are arranged and interrelated such that when the door is moved from the closed position to the open position, the follower plate is moved downwardly against the bias of the springs 64 to take it to a position wherein loading of the transparencies into the space between the follower plate 62 and the top wall 50 is facilitated.

In the embodiment shown, the interconnecting means that performs this function comprises pins 72, which extend outwardly through vertically extending slots 74 formed in the side walls 54 and 58. The pins 72 are rigidly connected to the edges of the follower plate 62 near the forward edge, the right-hand edge in FIGS. 3 and 4. Each cam plate 68 includes a cut-out interior defining a cam track 76 that is configured such that, during movement of the access door to the right or open position illustrated in FIG. 4, engagement between the cam track 76 and the cooperating cam follower pin 72 forces the follower plate 62 downwardly to the position shown in FIG. 4.

The subject invention further includes latch means for selectively maintaining movable wall or access door 60 in the open or closed position. As embodied herein, the latch means for maintaining door 60 in the open position includes a tab or protrusion 78 in cam track 76 that is arranged to ride over the respective pin 72 and provide a lock recess to lock the door in an open position for loading the transparencies. After the transparencies are loaded into the chat%her, the pins 72 can be manually moved downwardly and the door released to move to the fully closed position.

In the embodiment illustrated in FIG. 4, the cam plate 68 acts to move the forward or outer end of the follower plate 62 to an open position for easier loading as described. However, the inner end of the follower plate 62 is not pulled to a corresponding position but remains biased toward the nod wall 50 as shown in dotted lines in FIG. 4. Generally, this presents no problems but, if desired, the entire follower plate including the inner end can be caused to move away from top 50 against the bias of springs 64 upon opening of door 60. A mechanism for producing this result is shown in FIG. 8.

Figure 8:
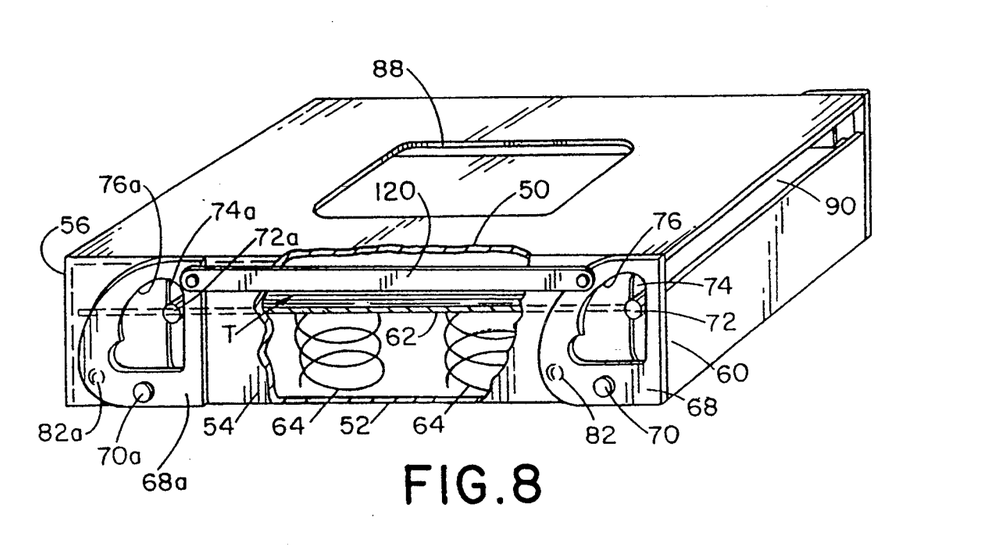
FIG. 8 is an isometric view of a second embodiment of the storage and dispensing cassette of this invention.

As illustrated in FIG. 8, the cassette structure of this alternate embodiment is basically the same as previously discussed with respect to the embodiment shown in FIGS. 3 and 4. However, a second set of cam plates 68a are added at the left-hand end of the cassette as viewed in FIG. 8. These cam plates are retained in place and mounted for pivotal movement by pins 70a. The follower plate is provided with cam follower pins 72a that extend outwardly through vertical slots 74a. Movement of the second set of cam plates 68a simultaneously with the first set 68 is achieved through the use of connecting bars or links 120, which join between the cam plates 68, 68a on each side of the cassette as illustrated. This arrangement assures that the opening of access door 60 moves the follower plate away from the top 50 along its entire length.

Figure 5:
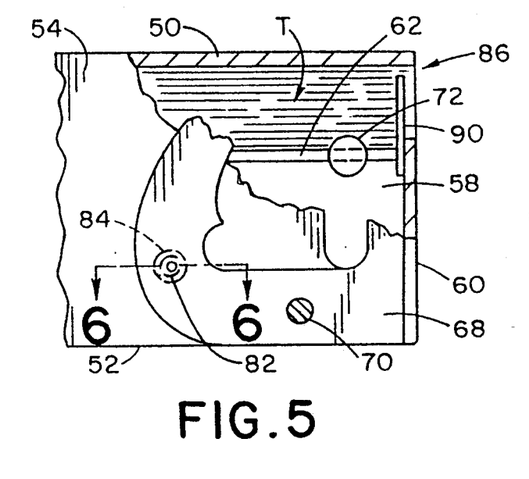
FIG. 5 is an enlarged partial end view of the cassette showing the door assembly and certain details of construction.
Figure 6:
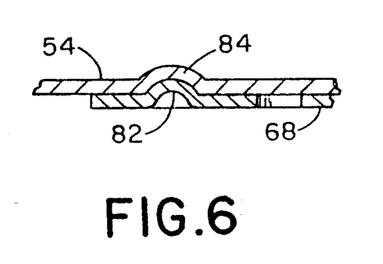
FIG. 6 is a cross-sectional view taken on line 6—6 of FIG. 5.

As embodied herein, the latch means of the subject invention for maintaining the door 60 resiliently in its closed position is provided by resilient detents best illustrated in FIGS. 5 and 6. Specifically, the cam plate 68 is deformed inwardly at 82 as illustrated in FIG. 6. A corresponding inward deformation 84 is formed in the side wall 54 at the location illustrated in FIG. 5. The inherent resiliency of the cam plate 68 causes a gripping action between the deformations 82 and 84 when the access door is in the closed position illustrated. However, manual force applied to swing the door to the open position causes the deformation 82 to move out of the deformation 84.

In order to allow the transparencies to be individually moved in sequential order from their stored position within the interior of the cassette, there is a discharge slot formed closely adjacent the top wall 50. Referring specifically to FIG. 5, a slot 86 is illustrated as extending the full length of access door 60 at a position directly above the door and beneath the wall 50. The slot 86 is formed by the upper edge of the access door 60 and the under surface of wall 50. In order that the individual transparencies T can be slid outwardly through the slot 86, there is an access opening 88 formed through the top wall 50 (see FIG. 1). The access opening 88 provides a means whereby the operator can engage the topmost transparency in the stored stack (with, for example, his or her hand) and push it sideways outwardly through slot 86. In order to assure that only a single transparency exits through slot 86, a retard means in the form of a resilient flap 90 is joined to the top edge of the door 60 and extends nearly to the top wall 50 as illustrated in FIG. 5. The retard flap 90 acts to engage and retain those transparencies beneath the topmost transparency during its movement out of slot 86 to a position on the upwardly facing projector platen 16.

It has been found that the action of pushing down on the stack of transparencies in order to manually slide the top transparency through the discharge slot occasionally depresses the follower plate and causes it to bind within the housing of the storage cassette. A third embodiment of the storage cassette of this invention is provided in order no alleviate this problem.

Figure 9:
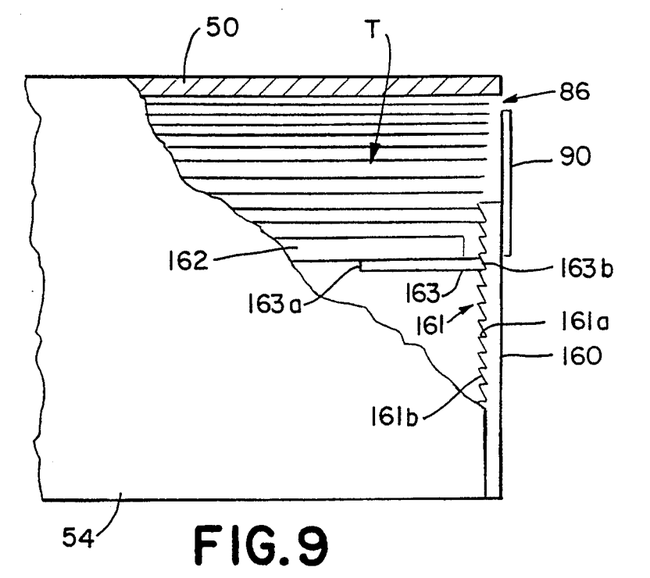
FIG. 9 is a cross-sectional view similar to that of FIG. 5 but for a third embodiment of the storage and dispensing cassette of this invention.

With reference to FIG. 9, a partial cross-sectional view of the open end of the cassette in which like elements are provided with the same reference numerals as in FIG. 5, the third embodiment of the storage cassette of this invention is provided with an access door 160 at the open end thereof. Access door 160 is movable from a closed position to an open position for loading a stack of transparencies T onto the follower plate 162 within the chamber. A transparency discharge slot 86 is defined between the top wall 50 of the housing and the top edge of access door 160 when the access door is in the closed position, as shown in FIG. 9. The transparency discharge slot is generally parallel to the top wall. This embodiment of the storage cassette also is provided with retard means adjacent the discharge slot for preventing discharge of more than one transparency at a time through the discharge slot. As embodied herein, the retard means include resilient flap 90 mounted on access door 160 adjacent the top edge thereof.

In order to prevent binding of follower plate 162 during discharge of the top transparency, the third embodiment of the storage cassette of this invention is provided with anti-pushdown means for preventing depression of the follower plate during manual sliding of the top transparency through the discharge slot. As embodied herein, the anti-pushdown means includes an engaging member 163 mounted on the edge of follower plate 162 adjacent the open end of the housing. Engaging member 163 includes a proximal end 163a connected to follower plate 162 and a distal end 163b that extends toward access door 160. The anti-pushdown means of this invention also includes engaging means, disposed on the inside face of the access door, for resisting downward movement of the engaging member during manual sliding of the top transparency through the discharge slot.

In the preferred embodiment of the anti-pushdown means, the engaging means includes a plurality of ratchet teeth 161 disposed one above the other on the inside face of access door 160, as shown in FIG. 9. Engaging men%her 163 preferably is a flexible ratchet flap having its proximal end 163a fixed follower plate 162 and its distal end 163b engageable with the ratchet teeth 161. As can be seen in FIG. 9, each ratchet tooth 161 preferably includes an upper surface 161a and a lower surface 161b, with the upper surface 161a being substantially parallel to the top wall 50 of the housing when the access door 160 is in the closed position.

As can be seen in FIG. 9, the distal end 163b of engaging men, her 163 rests on upper surface 161a of one of the ratchet teeth 161 and prevents engaging member 163 and follower plate 162 from being depressed when a force is applied to the top of the stack of transparencies T as the top transparency is being slid out of the cassette through discharge slot 86. As transparencies are removed off the top of stack T, however, the bias means (see, e.g., springs 64 in FIGS. 3 and 4) are able to push follower plate 162 upwardly because the flexible engaging member 163 is able to deflect and slide up lower surface 161b of the next higher ratchet tooth 161. Thus, the springs or other biasing means are permitted to act on the follower plate 162 in the upward direction but cannot be depressed by pressure exerted on the top of the stack T, and the follower plate moves upwardly in a stepwise manner by the interaction of engaging men%her 163 and ratchet teeth 161.

In a further modification of the anti-pushdown means of this invention, engaging member 163 can be a rigid ratchet flap with its proximal end 163a pivotally connected to the follower plate. The rigid ratchet flap preferably is mounted on the underside of the follower plate as shown in FIG. 9, and can be further provided with means for biasing the ratchet flap in an upward direction. In addition, although FIG. 9 shows a single ratchet flap extending across the width of follower plate 162, the invention also contemplates a plurality of ratchet flaps spaced along the width of the follower plate.

Figure 7:
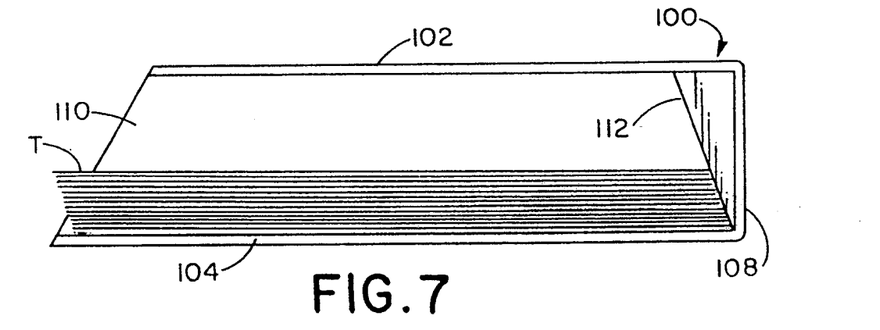
FIG. 7 is a cross-sectional view with portions broken away to more clearly show the construction of the transparency receiving receptacle or container used in the FIG. 1 assembly.

The overall system 12 further includes the previously mentioned receptacle B for receiving the transparencies after they have passed over the projector platen 16. As best illustrated in FIGS. 1 and 7, the receptacle B generally comprises a rectangular housing 100 that includes spaced parallel top and bottom walls 102 and 104 joined by three vertically extending side walls 106, 108, and 110. As can be appreciated, the various components of the receptacle 100 can be formed from any suitable rigid or semi-rigid sheet material, such as wood, metal, or plastic. Preferably, the left-hand side of the housing (as viewed in FIGS. 1 and 7) is open and is positioned in general alignment with the projector platen 16. Thus, the slides can be slid directly from the platen into the receiving chamber defined by the housing. Preferably, as best seen in FIG. 7, the interior of the housing 100 is provided with at least two inclined fins 112 which are positioned adjacent the side wall 108 and act to shift the stack of transparencies T out of true vertical alignment as shown. This facilitates separating the transparencies in the event that a previously used transparency is needed for review.

Although not previously mentioned, it should be noted that the support belts or straps 30 that interconnect the support surfaces 26 and 28 can be spaced such as to provide a guide or alignment for locating the transparencies on the projector platen.

In general, the overall use and functioning of the disclosed apparatus is quite obvious from the foregoing description, but to briefly review, it should be noted that the slides are first loaded as a stack in proper order of presentation with the first slide to be presented at the top of the stack. In loading the stack, the cassette's access door is manually pulled downward until it latches open as shown in FIG. 4, with the follower pins 72 engaging the latching notches formed by tabs 78 in the cam plates 68. This automatically retracts the follower plate to allow unencumbered loading of the stack into the storage cassette. To close the cassette door, the follower pins 72 are manually pulled downward just enough to free them from the latching notch or lock recess in the cam plates 68. Thereafter, releasing the pins allows the door to automatically close. The door is assured as being in the fully closed position by pushing on it until the cam plates latch into the detents formed by depressions 82, 84 of FIG. 6.

The slides are then fed manually one at a time by applying forward pressure with the fingers onto the top slide through the opening 88 in the top wall of the cassette. Gloves, finger cots, etc. can be worn to improve friction for feeding. Additionally, the inner top surface of the top wall 50 can be coated with a suitable material to decrease friction and allow free sliding of the topmost slide. As the top slide is slid out of the discharge slot 86, the resilient retard flap prevents multiple feeds by restraining the lower slides of the stack. The slides are manually slid into position on the projector platen with the adjustable straps of the frame assembly serving as alignment aids.

Each slide, after being displayed, is manually slid across the platen into the receptacle 100. The slides form a last-in/first-out stack which allows for quick access to slides which need to be reshown during a presentation. When the presentation is finished, the stack may be reloaded as is into the cassette for storage, though in reverse order, or individual slides from the receptacle can be placed in the cassette one at a time to reform the stack in its proper order.

Figure 10:
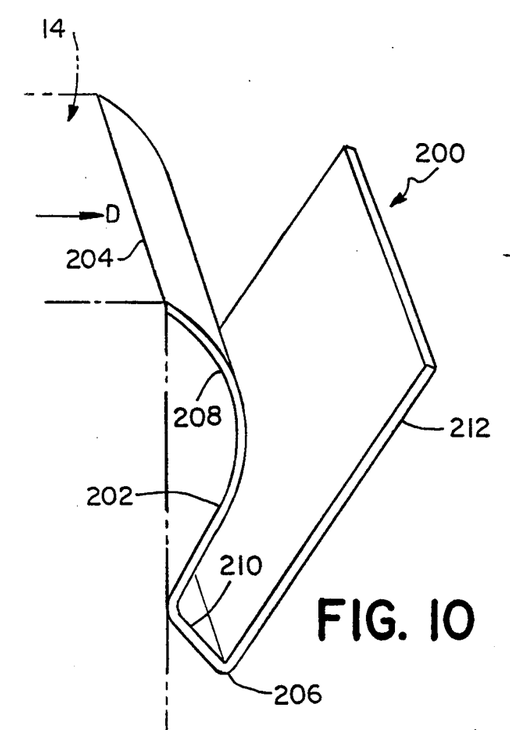
FIG. 10 is a isometric view of a second embodiment of the receiving receptacle of this invention.
Figure 11:
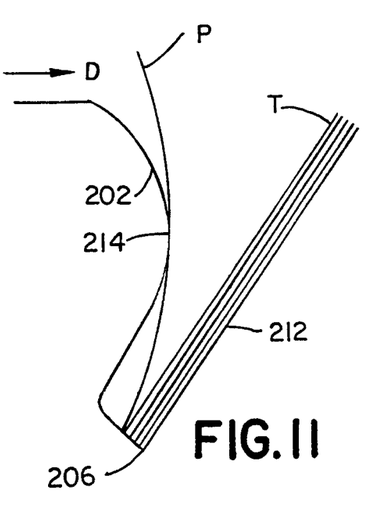
FIG. 11 is schematic side view of the receiving receptacle of FIG. 10 showing how the original order of the transparencies is maintained.

The embodiment of the transparency receptacle shown in FIGS. 1, 2, and 7 receives and stores the transparencies in reverse order relative to the original stack housed in the storage cassette. Consequently, before a new presentation can be made with the same transparencies, the transparencies must be reordered. To eliminate the requirement of reordering transparencies, this invention provides a second embodiment of a transparency receptacle, which is shown in FIGS. 10 and 11. Specifically, this further embodiment of the invention provides a receptacle 200 for receiving and maintaining the order or transparencies that have passed serially in a discharge direction D to a discharge side of an overhead projector platen.

Receptacle 200 comprises a reversing surface 202 and a storage surface 212. Reversing surface 202 includes an upper edge 204, a lower terminal edge 206, an upper curved portion 208 depending from upper edge 204, and a lower curved portion 210 depending from the upper curved portion 208 and terminating at lower terminal edge 206. As shown in FIGS. 10 and 11, the upper curved portion 208 is convex in the discharge direction D, and the lower curved portion 210 is concave in the discharge direction D. Storage surface 212 has a proximal edge connected to lower terminal edge 206 of the reversing surface 202 and a distal edge extending upwardly and in the discharge direction from the lower terminal edge 206. Storage surface 212 preferably is substantially planar.

The operation of receptacle 200 is shown in FIG. 11. When an individual transparency P is slid off the projector platen in discharge direction D, its leading edge falls into the trough between reversing surface 202 and storage surface 212 toward lower terminal edge 206. As the trailing edge of transparency P continues in the discharge direction D, the transparency comes to a rest on storage surface 212. Repetition of this procedure for a plurality of transparencies passed serially over the projector platen results in the transparencies retaining their original order.

In a preferred embodiment of receptacle 200, the reversing action of reversing surface 202 is facilitated by shaping reversing surface 202 such that it includes a point 214 that extends in the discharge direction D beyond the lower terminal edge 206. This helps ensure that the transparency is reversed so that its top face is directed toward storage surface 212.

Receptacle 200 can be mounted on an overhead projector by any number of means, including straps 30, 32 and adjustable legs 36 as shown in FIGS. 1 and 2. In such a case, straps 30, 32 would be connected to upper edge 204 of reversing surface 202, and legs 36 could be attached to the distal end of storage surface 212. In addition, receptacle 200 could be attached to the overhead projector housing directly, using threaded fasteners or the like. It also will be apparent that receptacle 200 has applicability in situations other than the discharge of overhead projector transparencies. For example, the concept of the reversing surface and storage surface can be used to maintain the proper order of pages discharged from a printer in serial fashion with the printed side facing upward.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

I claim:

1. A storage cassette for holding and dispensing overhead projector transparencies, comprising:
   a housing including top, bottom, and side walls defining a chamber therein, the housing having an open end sized to permit insertion of a stack of transparencies;
   a generally upwardly facing follower plate sized to support a stack of transparencies and located within the chamber with means for biasing the follower plate upwardly;
   an access door at the open end of the housing, the access door being movable from a closed position to an open position for loading a stack of transparencies onto the follower plate within the chamber, the access door having an inside face directed toward the follower plate within the chamber when in the closed position;
   a transparency discharge slot defined between the top wall of the housing and the top of the access door when the access door is in the closed position, the transparency discharge slot being generally parallel to the top wall;
   an access opening through the top wall of the housing for permitting manual access to the top transparency in the stack of transparencies on the follower plate to permit the top transparency to be slid manually through the discharge slot; and
   anti-pushdown means for preventing depression of the follower plate during manual sliding of the top transparency through the discharge slot.

2. The storage cassette as defined in claim 1, wherein the anti-pushdown means includes:

an engaging member mounted on the edge of the follower plate adjacent the open end of the housing, the engaging member extending toward the access door; and engaging means for resisting downward movement of the engaging member during manual sliding of the top transparency through the discharge slot, the engaging means being disposed on the inside face of the access door.

3. The storage cassette as defined in claim 2, wherein the engaging means includes a plurality of ratchet teeth disposed one above another on the inside face of the access door.

4. The storage cassette as defined in claim 3, wherein the engaging member is a flexible ratchet flap having a proximal end fixed to the follower plate and a distal end engageable with the ratchet teeth.

5. The storage cassette as defined in claim 3, wherein the engaging member is a rigid ratchet flap having a proximal end pivotally connected to the follower plate and a distal end engageable with the ratchet teeth.

6. The storage cassette as defined in claim 5, wherein the ratchet flap is mounted on the underside of the follower plate and the engaging men,her further includes means for biasing the ratchet flap in an upward direction.

7. The storage cassette as defined in claim 3, wherein each of the ratchet teeth includes an upper surface and a lower surface, the upper surface being substantially parallel to the top wall of the housing when the access door is in the closed position.

8. The storage cassette as defined in claim 1, further comprising retard means adjacent the discharge slot for preventing discharge of more than one transparency at a time through the discharge slot.

9. The storage cassette as defined in claim 8, wherein the retard means includes a resilient flap mounted on the access door adjacent the top edge thereof.

10. A receptacle for receiving and maintaining the order of transparencies that have been passed serially in a discharge direction to a discharge side of an overhead projector platen, the receptacle comprising:

a reversing surface adapted to be mounted on the discharge side of an overhead projector, the reversing surface including an upper edge, a lower terminal edge, an upper curved portion depending from the upper edge, and a lower curved portion depending from the upper curved portion and terminating at the lower terminal edge, the upper curved portion being convex in the discharge direction and the lower curved portion being concave in the discharge direction; and a storage surface having a proximal edge connected to the lower terminal edge of the reversing surface and a distal edge extending upwardly and in the discharge direction from the lower terminal edge.

11. The transparency receptacle as defined in claim 10, wherein the storage surface is substantially planar.

12. The transparency receptacle as defined in claim 10, further comprising mounting means for disposing the upper edge of the reversing surface adjacent the discharge side of the overhead projector platen.

13. The transparency receptacle as defined in claim 12, wherein the mounting means includes a pair of straps that overlie the overhead projector platen and are connected to the upper edge of the reversing surface.

14. The transparency receptacle as defined in claim 12, wherein the mounting means includes means for disposing the reversing surface such that the first curved portion of the reversing surface extends in the discharge direction beyond the lower terminal edge of the reversing surface.

15. A system for facilitating the handling of overhead projector transparencies on an overhead projector of the type including an upwardly facing projector platen, the system comprising:

a transparency storage cassette disposed on one side of the projector platen, the storage cassette including a housing defining a chamber, the housing having an open end through which transparencies can be discharged serially in a discharge direction from the storage cassette to the projector platen;

a receptacle for receiving and maintaining the order of transparencies that have been passed serially in the discharge direction from the storage cassette over the projector platen, the receptacle comprising:

a reversing surface including an upper edge, a lower terminal edge, an upper curved portion depending from the upper edge, and a lower curved portion depending from the upper curved portion and terminating at the lower terminal edge, the upper curved portion being convex in the discharge direction and the lower curved portion being concave in the discharge direction, and a storage surface having a proximal edge connected to the lower terminal edge of the reversing surface and a distal edge extending upwardly and in the discharge direction from the lower terminal edge; and means for mounting the storage cassette and receptacle on opposite sides of the projector platen such that transparencies can be discharged in the discharge direction from the storage cassette, over the projector platen, and into the receptacle.

16. The system as defined in claim 15, wherein the mounting means includes:

a support surface on the one side of the projector platen for supporting the storage cassette;

a pair of straps that overlie the overhead projector platen, each of the straps having one end connected to the support surface and a second end connected to the upper edge of the reversing surface.

17. The system as defined in claim 16, wherein the mounting means further includes a pair of leg members connected between the support surface and the overhead projector.

18. The system as defined in claim 16, wherein the mounting means further includes a pair of leg members connected between the storage surface of the receptacle and the overhead projector.

19. The system as defined in claim 18, wherein the lengths of the leg members are adjustable to position the reversing surface such that the first curved portion of the reversing surface extends in the discharge direction beyond the lower terminal edge of the reversing surface.

* * * * *